United States Patent
Shenhar et al.

(10) Patent No.: US 9,181,403 B2
(45) Date of Patent: Nov. 10, 2015

(54) QUASI-BLOCK COPOLYMER MELTS, PROCESSES FOR THEIR PREPARATION AND USES THEREOF

(75) Inventors: Roy Shenhar, Mevassert Zion (IL); Paul F. Nealey, Madison, WI (US); Marcus Müller, Gotteingen (DE); Kostas Daoulas, Gottingen (DE)

(73) Assignees: WISCONSIN ALUMNI RESEARCH FOUNDATION, Madison, WI (US); YISSUM RESEARCH DEVELOPMENT COMPANY OF THE HEBREW UNIVERSITY OF JERUSALEM, LTD., Jerusalem (IL)

(*) Notice: Subject to any disclaimer, the term of this patent is extended or adjusted under 35 U.S.C. 154(b) by 76 days.

(21) Appl. No.: 13/600,138

(22) Filed: Aug. 30, 2012

(65) Prior Publication Data

US 2013/0109805 A1 May 2, 2013

Related U.S. Application Data

(60) Provisional application No. 61/528,934, filed on Aug. 30, 2011.

(51) Int. Cl.

| | |
|---|---|
| C08F 293/00 | (2006.01) |
| C08G 71/00 | (2006.01) |
| C08G 73/00 | (2006.01) |
| C08G 81/00 | (2006.01) |
| C08G 81/02 | (2006.01) |
| C08G 83/00 | (2006.01) |
| C08J 5/00 | (2006.01) |
| C09D 201/00 | (2006.01) |
| B82Y 30/00 | (2011.01) |

(52) U.S. Cl.
CPC ............. *C08G 81/00* (2013.01); *B82Y 30/00* (2013.01); *C08G 81/02* (2013.01); *C08G 83/008* (2013.01); *C08J 5/005* (2013.01); *C09D 201/005* (2013.01); *C08J 2300/204* (2013.01)

(58) Field of Classification Search
CPC .................. C08J 2300/204; C08G 83/008
USPC .................. 525/417, 418, 452, 539, 540
See application file for complete search history.

(56) References Cited

U.S. PATENT DOCUMENTS

2012/0289652 A1* 11/2012 Badel et al. .............. 524/607

FOREIGN PATENT DOCUMENTS

WO    WO 2011/015525    *    2/2011

OTHER PUBLICATIONS

Beck, et al., Metal/Ligand-Induced Formation of Metallo-Supramolecular Polymers, Macromolecules, 2005, pp. 5060-5068, vol. 38.
Chiper, et al., Synthesis and Micellization of Coil-Rod-Coil Ruthenium (II) Terpyridine Assemblies, Macromolecules, 2008, pp. 8823-8831, vol. 41.
Daoulas, et al., Directed Assembly of Supramolecular Copolymers in Thin Films: Thermodynamic and Kinetic Advantages, Physical Review Letters, 2010, pp. 10830-1-18301-4, PRL 105.

(Continued)

*Primary Examiner* — Jeffrey Mullis
(74) *Attorney, Agent, or Firm* — Browdy and Neimark, P.L.L.C.

(57) ABSTRACT

The present invention provides block copolymers comprising at least one covalent polymer block and at least one supramolecular polymer block, processes for their preparations and uses thereof.

20 Claims, 11 Drawing Sheets
(8 of 11 Drawing Sheet(s) Filed in Color)

(56) References Cited

OTHER PUBLICATIONS

Daoulas, et al., Phase behaviour of quasi-block copolymers: A DFT-based Monte-Carlo study, Soft Matter, 2009, pp. 4499-4509, vol. 5.

Feldman, et al., Polymers with Multiple Hydrogen-Bonded End Groups and Their Blends, Macromolecules, 2008, pp. 4694-4700, vol. 41.

Fustin, et al., Metallo-Supramolecular Block Copolymers, Advanced Materials, 2007, pp. 1665-1673, vol. 19.

Gohy, Metallo-supramolecular block copolymer micelles, Coordination Chemistry Reviews, 2009, pp. 2214-2225, vol. 253.

Liu, et al., Integration of Density Multiplication in the Formation of Device-Oriented Structures by Directed Assembly of Block Copolymer-Homopolymer Blends, Advanced Functional Materials, 2010, pp. 1251-1257, vol. 20.

Meier, et al., Supramolecular ABA Triblock Copolymers via a Polycondensation Approach: Synthesis, Characterization, and Micelle Formation, Macromolecules, 2006, pp. 1569-1576, vol. 39.

Ohkawa, et al., Supramolecular Graft Copolymers Based on 2,7-Diamido-1,8-naphthyridines, Macromolecules, 2007, pp. 1453-1459, vol. 40.

Ott, et al., Tuning the morphologies of amphiphilic metallo-supramolecular triblock terpolymers: from spherical micelles to switchable vesicles, Soft Matter, 2009, pp. 84-91, vol. 5.

Vora, et al., Blends of PS-PMMA Diblock Copolymers with a Directionally Hydrogen Bonding Polymer Additive, Macromolecules, 2010, pp. 1199-1202, vol. 43.

Weiss, et al., Quasi-Block Copolymers: Design, Synthesis, and Evidence for Their Formation in Solution and in the Melt, Macromolecules, 2011, pp. 9773-9781, vol. 44.

Wisse, et al., Segmental Orientation in Well-Defined Thermoplastic Elastomers Containing Supramolecular Fillers, Macromolecules, 2009, pp. 524-530, vol. 42.

Wisse, et al., Unusual Tuning of Mechanical Properties of Thermoplastic Elastomers Using Supramolecular Fillers, Macromolecules, 2006, pp. 7425-7432, vol. 39.

Yan, et al., Spherocylindrical coacervate core micelles formed by a supramolecular coordination polymer and a diblock copolymer, Soft Matter, 2008, pp. 2207-2212, vol. 4.

Yan, et al., Wormlike Aggregates from a Supramolecular Coordination Polymer and a Diblock Copolymer, J. Phys. Chem. B, 2007, pp. 11662-11669, vol. 111.

Albini, Angelo, Photochemistry, 2011, p. 32, vol. 39.

Beijer, et al., Abstract Only, Strong Dimerization of Ureidopyrimidones via Quadruple Hydrogen Bonding, J. Am. Chem. Soc., 1998, pp. 6761-6769, vol. 120(27).

"Block copolymers", Chapter 2, pp. 4-15, in Jiang, Electric Field Effects on Alignment of Lamellar Structures in Diblock Copolymer Thin Films Studied by Neutron Scattering, (Ph.D. Dissertation, Martin-Luther-Universitat Halle-Wittenberg, 2006)sundoc.bibliothek.uni-halle.de/diss-online/06-07H019/t3.pdf.

ChemSpider, bis-terpyridine cobalt(ii), ChemSpider ID:24769821, http://vvww.chemspider.com/Chemical-Structure.24769821.html, [accessed entry Feb. 9, 2015].

Felder, et al., Alternation and tunable composition in hydrogen bonded supramolecular copolymers, Chem. Commun., Jan. 2014, pp. 2455-2457, vol. 50.

Huntsman, Technical Bulletin, Jeffamine ED-600 Polyetheramine, 2007, http://www.huntsman.com/portal/page/portal/C348531D1ADDA9A2E040EBCD2B6B7B06.

Jeong, et al., Directed self-assembly of block copolymers for next generation nanolithography, Materials Today, Dec. 2013, vol. 16, No. 12.

Jenkins, et al. (International Union of Pure and Applied Chemistry, Macromolecular Division Commission on Marcromoleuclar Nomenclature), Glossary of Basic Terms in Polymer Science, Pure & Appl. Chem., 1996, pp. 2287-2311, vol. 68, No. 12.

Kane, et al., Molecular, Nanostructural and Mechanical Characteristics of Lamellar Triblock Copolymer Blends: Effects of Molecular Weight and Constraint, Macromol. Rapid Commun., 2001, pp. 281-296, vol. 22.

Li, et al., Block copolymer patterns and templates, Materialstoday, Sep. 2006, pp. 30-39, vol. 9, No. 9.

Ligthart, et al., Complementary Quadruple Hydrogen Bonding for Supramolecular Architectures, Polymer Preprints, 2005, pp. 1098-1099, vol. 46(2).

Nair, Kamlesh Prabhakaran, Multi-functionalized Side-chain Supramolecular Polymers: A Methodology Towards Tunable Functional Materials, (Ph.D. Dissertation, School of Chemistry and Biochemistry, Georgia Institute of Technology, Jul. 2008), cover page and p. 73.

Pinault, et al., Chain stopper engineering for hydrogen bonded supramolecular polymers, Beilstein J. Org. Chem., 2010, pp. 869-875, vol. 6.

Sauvage, et al., Ruthenium (II) and Osmium (II) Bis(terpyridine) Complexes in Covalently-Linked Multicomponent Systems: Synthesis, Electrochemical Behavior, Absorption Spectra, and Photochemical and Photophysical Properties, Chem. Rev., 1994, p. 993, vol. 94 (first page only, in lieu of abstract).

Forch, et al., Surface Design: Applications in Bioscience and Nanotechnology, 2009, p. 13.

\* cited by examiner

QUASI-BLOCK COPOLYMER MELTS, PROCESSES FOR THEIR PREPARATION AND USES THEREOF

This invention was made with government support under 0832760 awarded by National Science Foundation. The government has certain rights in the invention.

FIELD OF THE INVENTION

This invention relates to melts of block copolymers comprising at least one covalent polymer block and at least one supramolecular polymer block, processes for their preparations and uses thereof.

BACKGROUND OF THE INVENTION

One of the challenges in nanofabrication is the integration of self-assembling materials into existing manufacturing strategies to achieve molecular-level process control and the ability to produce useful architectures. Films of block copolymers can be directed to assemble on chemically patterned substrates into predictable and desirable morphologies and orientations with respect to the substrate, which can be used to augment and enhance the lithographic process.

When comparing the pattern in resist to the pattern of domains induced to assemble in the block copolymer film, directed assembly has been demonstrated to achieve high degrees of pattern perfection, placement of features at the precision of the lithographic tool used to make the chemical pattern, improved dimensional control of features, improved line edge and line width roughness, and resolution enhancement by factors of two to four.

In addition, this approach is the only method that has been demonstrated to robustly achieve non-regular device-oriented geometries used in the fabrication of integrated circuits or servo patterns on hard drives, most recently with resolution enhancement by multiplication of feature density by interpolation on low duty cycle chemical patterns.

While replication of periodic structures can be easily demonstrated through graphoepitaxy of simple di-block copolymers, the insertion point of these materials in the production of integrated circuits requires the ability to replicate non-regular structures, such as long lines, short segments, sharp 90° bends, jogs, T-junctions, periodic arrays of contact openings, and combinations thereof. Casting di-block copolymers alone on such patterned substrates resulted in the formation of various defects due to the incommensurability between the inherent period of the block copolymer and the different periods abundant in non-regular structures.

To overcome this limitation, blends of diblock copolymers and homopolymers were employed (Liu, G. L.; Thomas, C. S.; Craig, G. S. W.; Nealey, P. F., Adv. Funct. Mater. 2010, 20, 1251-1257). The presence of the homo-polymer enables the system to alleviate local frustrations by distributing the homo-polymer chains non-uniformly throughout the film, segregating them to the built-in "defect" points in the structure. However, this approach was found to be limited, requiring each pattern to have a specific blend composition, requiring the fine-tuning of the composition of the ternary blend. Furthermore, this approach is limited by the low diffusion rates of the homo-polymers, hindering the homo-polymers from reaching the respective locations in the film. Thus, for various patterns, the ternary blend may reproduce the structure with poor fidelity.

In order to overcome the limitations of conventional polymer materials, the inventors of the present application found that incorporation of a supramolecular block into a conventional block co-polymer provides that additional structural flexibility needed for replicating non-regular structures with high conformity and limited number of defects.

SUMMARY OF THE INVENTION

In its first aspect the preset invention provides a block copolymer comprising: at least one covalent polymer block and at least one supramolecular polymer block; wherein said copolymer is in a form of a melt.

In some embodiments, said block copolymer of the invention is substantially free of solvent (i.e. it contains less than 0.5% of solvent or a mixture of solvents, in some other embodiments less than 0.3%, 0.2%, 0.1%, 0.05%, 0.01% of solvent or a mixture of solvents).

The term "block copolymer" is meant to encompass a polymer formed from two or more homo-polymer subunits (blocks) linearly linked by chemical bonds (i.e. the blocks are connected end-to-end). Block copolymers with two, three, four and multiple homo-polymer units are referred to as di-block, tri-block, tetra-blocks and multi-blocks respectively. The number of monomer types in a block co-polymer may be less than or equal to the number of blocks. Thus, an ABC linear tri-block consists of three monomer types, whereas an ABA linear tri-block consists of two monomer types.

The term "melt form" or "melt state" used interchangeably refers to a physical state of said block copolymer which is between a solid state and a liquid state, wherein the block copolymer is in a phase of a neat polymeric material, substantially without any solvent. A block copolymer of the invention in a melt state or form is defined by the fact that it contains no solvent.

Thus, in a further aspect the preset invention provides a block copolymer comprising: at least one covalent polymer block and at least one supramolecular polymer block; wherein said copolymer is substantially free of solvent (i.e. it contains less than 0.5% of solvent).

The block copolymer of the present invention comprises at least one block of a covalently bonded polymer termed a "covalent polymer block". In the context of the present invention the term "covalent polymer block" is meant to encompass a block of any polymer, wherein its monomers in the chain of said polymer block are connected to each other via covalent bonds. Such covalent bonds include: sigma bonds, double bonds, triple bonds and any combination thereof. At the end of the chains of said block said monomer of covalent block is covalently bonded to a monomer having a functional group capable of forming at least one non-covalent bond with a monomer of said supramolecular block polymer. In some embodiments of the invention, said covalent polymer comprises at least one type of monomer. In further embodiments said covalent polymer comprises two different types (two different molecules) of monomer.

In some embodiments of the invention, said at least one covalent polymer block is selected from polystyrene, poly(2-vinyl pyridine), poly(4-vinyl pyridine), poly(methyl methacrylate), poly(n-butyl acrylate), poly(ethylene oxide), poly(propylene oxide), poly(1,4-butadiene), poly(1,2-butadiene), polyisoprene, and any combination thereof.

The block copolymer of the present invention also comprises at least one block of a supramolecular bonded polymer termed "supramolecular polymer block". In the context of the present invention, the term "supramolecular polymer block" is meant to encompass a block of any polymer, wherein its monomers are connected to each other via at least one supramolecular bond, i.e. any non-covalent bonds connecting the monomers of said polymer that are reversible (i.e. can form and break in accordance with the surrounding conditions such as for example the temperature, solvent, pH, light, physical stress, ions, small molecules, etc.) having an association constant of at least $10^2$ $M^{-1}$. Non-limiting list of non-covalent bonds include: hydrogen bonds, electrostatic bonds, ionic bonds, metal-ligand coordination bonds, π-stacking, or any combination thereof. The monomers of such supramolecular polymer comprise at least one functional group that enables each monomer to be interconnected to its neighboring monomers via at least such a non-covalent bond. In some embodiments, said monomers of such supramolecular polymer comprise at least two functional groups that enable each monomer to be interconnected to its neighboring monomers via at least such a non-covalent bond. In further embodiments said at least two functional groups of said supramolecular polymer are the same (i.e. symmetrical monomer) or different (i.e. asymmetrical monomer). In yet further embodiments said supramolecular polymer comprises at least one type of monomer. In further embodiments said supramolecular polymer comprises two different types (two different molecules) of monomer.

Supramolecular polymers exhibit strong concentration-dependent viscosities and obey the predictions of the well established theories of polymer physics. The reversibility of the bonding between the monomeric units, however, makes supramolecular polymers highly sensitive to different factors that affect the bonding such as temperature, type of solvent, and presence of competitive molecules. Supramolecular polymers thus give rise to environmentally-responsive materials that can be easily assembled and dismantled under designed conditions, a feature that strongly affects their material properties.

The number-average degree of polymerization ($<N>$) of supramolecular polymers is dictated by the association constant K and the concentration of the monomer c. For sufficiently high values of K and c, $<N> \approx 2(Kc)^{1/2}$. While large values of K are a prerequisite for obtaining long polymer chains from supramolecular monomers, they also cause the polydispersity index (PDI) to approach the theoretical value of 2 (in analogy to step polymerization). Thus, in some embodiments said $<N>$ value of said supramolecular polymer is at least about 5.

In some embodiments, the monomers in the chain of a supramolecular polymer consist of molecules having at least two functional groups capable of forming non-covalent bonds (interactions) with a corresponding group of the neighboring monomer.

In some other embodiments said at least two functional groups may be the same (affording a symmetrical supramolecular polymer) or different (thus affording an asymmetrical supramolecular polymer).

In further embodiments, at the end of the chains of the supramolecular polymer block said monomers consist of at least one functional group capable of forming a non-covalent bond with a corresponding monomer of said supramolecular polymer and at least one other functional group capable of forming a covalent bond with a monomer of said covalent polymer block.

In some embodiments, said at least one supramolecular block is selected from poly(EHUT) (bis(ethyl-2-hexylureido) toluene), poly(bis-UPy) (poly-bisureidopyrimidinone), poly (UPy-NAPy), poly(thymine-diamidopyridine), poly(bis-terpyridine), and any combination thereof.

The block copolymer of the invention comprising at least one covalent polymer block and at least one supramolecular polymer block is also termed herein "quasi-block copolymer" (q-BCP). In some embodiments said q-BCP comprises one covalent polymer block and one supramolecular polymer block (di-block). In further embodiments said q-BCP comprises one covalent polymer block and two supramolecular polymer blocks (tri-block). Under these embodiments, said two supramolecular polymer blocks may be the same or different (difference can be in molecular features of the monomers and/or the length of the polymer). In further embodiments said q-BCP comprises two covalent polymer blocks and one supramolecular polymer block (tri-block). Under these embodiments, said two covalent polymer blocks may be the same or different (difference can be in molecular features of the monomers and/or the length of the polymer). In yet further embodiments said q-BCP comprises two covalent polymer block and two supramolecular polymer blocks (quadruple-block). Under these embodiments, said two supramolecular polymer blocks and said two covalent polymer blocks may be the same or different (difference can be in molecular features of the monomers and/or the length of the polymer).

In some embodiments, a block copolymer of the invention has a volume fraction between said at least one covalent polymer block and at least one supramolecular polymer block is between about 0.1 to about 0.9.

In a further aspect the invention provides a composition comprising a block copolymer of the invention (i.e. comprising at least one covalent polymer block and at least one supramolecular polymer block, as defined herein above). In some embodiments said composition further comprises at least one homo-polymer of said polymer blocks (i.e. at least one homo-polymer of said at least one covalent polymer and at least one supramolecular polymer).

In some further embodiments, a block copolymer of the invention is used in the preparation of a nanostructure.

In other aspects of the invention there is provided a use of a block copolymer of the invention, for the manufacture of a nanostructure.

In yet further aspects of the invention there is provided a use of a composition of the invention, for the manufacture of a nanostructure The term "nanostructure" is meant to encompass any object having at least one dimension in a nano-scale. Non-limiting examples of nanostructures include: nanotextured surfaces or films (having one dimension on the nanoscale, i.e., only the thickness of the surface of an object is between 1 and 500 nm, in other embodiments 1 and 100 nm), nanotubes (having two dimensions on the nanoscale, i.e., the diameter of the tube is between 1 and 500 nm, in other embodiments 1 and 100 nm), spherical nanoparticle (having three dimensions on the nanoscale, i.e., the particle is between 1 and 500 nm in each spatial dimension, in other embodiments 1 and 100 nm). Non-limiting list of additional nanostructures include: nanocages, nanocomposite, nanofabrics, nanofiber, nanoflake, nanofoam, nanomesh, nanoparticle, nanopillar, nanoplatelet, nanorod, nanoshell, nanotip.

In some embodiments, a block copolymer of the invention is used in the formation of a film. In further embodiments, said film has a thickness of at least 10 nm. In further embodiments, said film has a thickness of between about 10 nm to about 300 nm.

In a further aspect the invention provides a nanostructure comprising a block copolymer comprising: at least one covalent polymer block and at least one supramolecular polymer block. In some embodiments said nanostructure is a film. In a further embodiment said film has a thickness of at least 10 nm. In yet a further embodiments said film has a patterned surface.

In further embodiments, a block copolymer of the invention is used in forming a film having a surface pattern replicated from a patterned substrate.

Said substrate may be patterned by any type of patterning technique including, but not limited to: chemical patterning, x-ray lithography, extreme UV lithography, electron beam lithography and so forth.

In some embodiments, said patterned substrate comprises a patterned imaging layer. In further embodiments, the imaging layer comprises a polymer brush or a self-assembled monolayer. Examples of polymer brushes include homopolymers or copolymers of the monomers that make up the block copolymer melt of the invention. Other examples of self-assembled monomers include silanes, siloxane and derivatives thereof.

In some embodiments, said substrate, and subsequently said film of block copolymer of the inventions, is patterned with at least one periodic region. In other embodiments, said substrate, and subsequently said film of block copolymer of the invention, is patterned with at least one aperiodic region. In yet further embodiments, said substrate, and subsequently said film of block copolymer of the inventions, is patterned with both at least one periodic region and at least one aperiodic region.

In the context of the present invention the term "periodic region" is meant to encompass a pattern that comprises a region wherein at least one feature is periodically repeated throughout the region, such as for example a linear feature.

In the context of the present invention the term "aperiodic region" is meant to encompass a pattern that comprises a region having at least one irregular feature. In some embodiments, said substrate is pattered with at least one irregular feature selected from an angle, a T-junction, a ring, a corner, a bifurcation, a jog, or any combination thereof.

In yet further embodiments, said formation of said film comprises: (a) providing a patterned substrate; (b) depositing a layer of said block copolymer on said substrate to form a layered substrate; and (c) subjecting the layered substrate to conditions that cause said block copolymer to order in accordance with the underlying pattern, thereby forming a nanostructure replicating said pattern.

In further embodiments, the fidelity of the replication comprises less than about 25% error. For example, a 40 nm wide feature on the substrate may be replicated by a copolymer of the invention as a 45 nm feature. Such fidelity may be achieved with any feature of the replicated pattern including, but not limited to: feature size, separation distance, periodicity (for a periodic structure) and so forth.

In some embodiments, said conditions cause said block copolymer to order in accordance with the underlying pattern of said substrate is selected from thermal annealing, solvent annealing (i.e. incubation in solvent vapor, under predetermined vapor pressure and temperature, for a certain duration of time and with controlled removal of the vapor (mainly the drying rate). In other embodiments, said conditions cause said block copolymer to order in accordance with the underlying pattern of said substrate includes configuration of the substrate patterns so that regions of the substrate pattern interact with a highly preferential manner with at least one of the blocks of the copolymer of the invention. In some embodiments, said conditions cause said block copolymer to order in accordance with the underlying pattern of said substrate includes stretching or compressing the copolymer deposited. In some embodiments, said conditions cause said block copolymer to order in accordance with the underlying pattern of said substrate includes non-uniform distribution of said copolymer on the substrate.

A method of forming a nanostructure having a pattern, said method comprising: (a) providing a patterned substrate; (b) depositing a layer of a block copolymer according to the present invention on said substrate to form a layered substrate; and (c) subjecting the layered substrate to conditions that cause said block copolymer to order in accordance with the underlying pattern, thereby forming a nanostructure having a pattern.

The methods and block copolymers of the invention may be used in semiconductor processing. The copolymer of the invention may be used as a resist mask and the methods of the invention may include selectively removing components of the copolymer of the invention or selectively incorporating additives such as metals, sol-gel precursors, and so forth after the material is ordered in accordance with the underlying pattern.

The methods of copolymers of the invention may also be used to create functional copolymer features, such as nanoscale conductive lines. For example, one of the components of the copolymer of the invention may be an insulator and another one of the components may be a conductor. The copolymer may be insulating or conducting or incorporate insulating or conducting materials, such as for example conductive nanoparticles.

In a further aspect the invention provides a method of preparing a block copolymer comprising at least one covalent polymer block and at least one supramolecular polymer block, said method comprising the steps of: (a) providing at least one covalent polymer capped with at least one monomer having at least one functional group capable of forming a non-covalent bond; (b) providing at least one supramolecular polymer formed by monomers having at least two independent functional groups capable of forming non-covalent bonds; and (c) mixing said capped covalent polymer with a supramolecular polymer; thereby forming said quasi-block copolymer.

FIG. 1A shows a schematic illustration of the formation of a quasi-block copolymer (q-BCP) wherein bi-functional supramolecular monomers first create long supramolecular chains; addition of end-functionalized conventional polymers (capped covalent polymers), acting as chain stoppers, leads to the formation of q-BCPs. Further addition of said capped covalent polymers leads to the formation of tri-block copolymer. FIG. 1B shows another schematic illustration of the formation of a quasi-block copolymer (q-BCP) wherein bi-functional supramolecular monomers first create long supramolecular chains; addition of end-functionalized conventional polymers (end capped covalent polymer), acting as chain stoppers, leads to the formation of q-BCPs. In this figure, it is shown that said bi-functional monomers of the supramolecular block may be symmetrical (i.e. have the same functional group at the terminal capable of forming a non-covalent bond between them, thereby connecting said monomers to form supramolecular polymer) or asymmetric (i.e. having complementary, however different terminal functional groups capable of forming a non-covalent bond between them, thereby connecting said monomers to form supramolecular polymer).

In some embodiments of a method of preparing a block copolymer of the invention step (a) is repeated. In further embodiments, step (a) is repeated with a different type of covalent polymer.

In some embodiments of a method of preparing a block copolymer of the invention steps (a) and (b) are repeated. In further embodiments, steps (a) and (b) are each independently repeated with a different covalent polymer and/or supramolecular polymer.

The term "monomer having [at least one or at least two] functional group capable of forming a non-covalent bond" is meant to encompass any monomer having a terminal functional group that is capable of forming a non-covalent bond, including but not limited to hydrogen bonds, electrostatic interactions, -stacking, aromatic-stacking, metal-ligand stacking and so forth. In some embodiments, said monomer may comprise at least one functional group. In other embodiments, said monomer may comprise at least two independent functional groups. Such groups include, but are not limited to: hydroxyl groups, amine groups, amide groups, carboxy groups, acidic groups, basic groups, ionic groups, aromatic rings, non-saturated groups and any combination thereof.

When referring to a covalent polymer capped with at least one monomer having at least one functional group capable of forming a non-covalent bond it should be understood to mean a covalent polymer formed by monomers covalently bonded to each other wherein its end terminal is connected to a monomer comprising said functional group. This end terminal (capping) group serves as a "chain stopper" for the supramolecular polymer, thereby forming a block copolymer of the invention.

Thus, the present invention provides versatile imaging materials that are capable of replicating sets of non-regular structures required for microelectronic circuit fabrication through lithographic and/or non-lithographic, self-assembly process. As the accessible length scales of features that can be replicated in this process could be on the order of 10 nm, it could serve as the basis for the paradigm shift required for continuing the miniaturization of microelectronic components in parallel device fabrication.

In a further aspect the invention provides a device comprising a nanostructure of the invention. Such devices include, but are not limited to integrated circuits or servo patterns on hard drives.

BRIEF DESCRIPTION OF THE DRAWINGS

The patent or application file contains at least one drawing executed in color. Copies of this patent or patent application publication with color drawings will be provided by the Office upon request and payment of the necessary fee.

In order to understand the invention and to see how it may be carried out in practice, embodiments will now be described, by way of non-limiting example only, with reference to the accompanying drawings, in which:

FIG. 6A 7:3 CHCl$_3$:toluene, FIG. 6B 5:5 CHCl$_3$:toluene, FIG. 6C 3:7 CHCl$_3$:toluene. The dashed lines represent reaching the maximum detection limit in the viscosity measurements of the next concentration.

(FIG. 8B)

DETAILED DESCRIPTION OF EMBODIMENTS

Figure 1A:
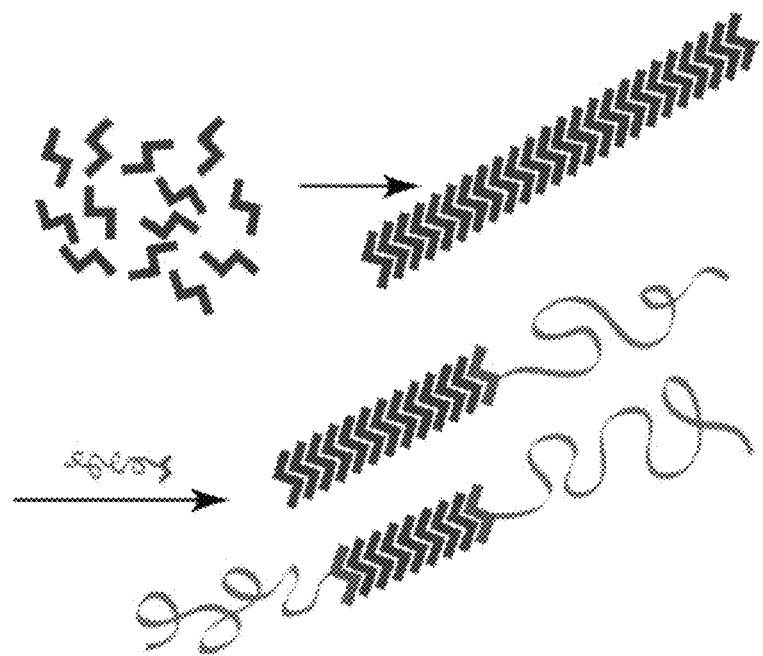
FIG. 1A shows a schematic illustration of the formation of a quasi-block copolymer (q-BCP): bi-functional supramolecular monomers first create long supramolecular chains; addition of end-functionalized conventional polymers, acting as chain stoppers, leads to the formation of q-BCPs.
Figure 1B:
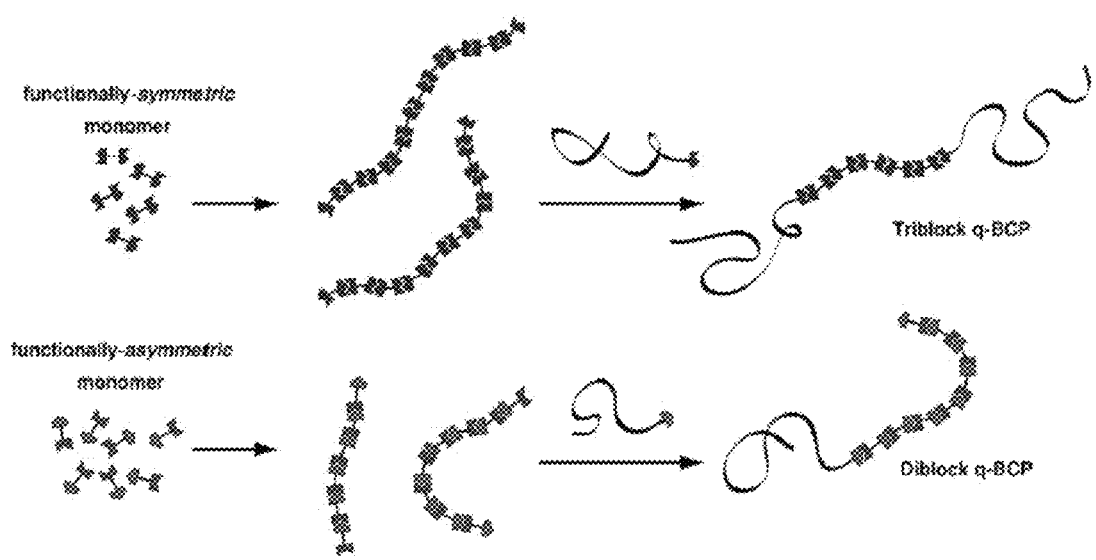
FIG. 1B shows a schematic illustration of the formation of a quasi-block copolymer (q-BCP): bi-functional supramolecular monomers first create long supramolecular chains; addition of end-functionalized conventional polymers, acting as chain stoppers, leads to the formation of q-BCPs.

Synthesis and Characterization of the End-Functionalized Block

Polystyrene (PS) and polyacrylates (e.g., poly(n-butylacrylate)) serve as models for the conventional block. Two types of bifunctional monomers, Bisureidopyrimidinone (bis-UPy), and bis(ethyl-2-hexylureido)toluene (EHUT), serve as models for the functionally-symmetric and functionally-asymmetric supramolecular monomers, respectively.

The corresponding monofunctional unit (i.e., UPy in one case, and alkylated derivatives of bisureidotoluene, DiBUT and TriBUT, in the other) are attached to the PS end and serve as the chain stopper. In addition, a carboxylate- or sulfonate-terminated PS (denoted as PS—COO$^-$ or PS—SO$_3^-$, respectively) may also be employed as a general chain stopper, which should be able, in principle, to terminate both types of supramolecular monomers.

The dimerization constants in chloroform of EHUT and UPy are $10^5$ and $6\times10^7$ M$^{-1}$ respectively, which guarantees degrees of polymerizations (DP) on the order of a few tens to a few hundreds at millimolar monomer concentrations. The main difference between these supramolecular polymers, however, is that bis-UPy monomers are expected to yield a flexible coil supramolecular polymer while EHUT molecules are known to form rigid rod supramolecular polymers. This difference will give rise to a diverse set of phases.

For the end-capped polymers, the method which employs modified initiators for atom transfer radical polymerization (ATRP) is utilized. This polymerization method, is compatible with many types of functionalities, can be easily applied also for the synthesis of PS, and guarantees that the desired supramolecular functionality is attached at the beginning of each growing chain, which eliminates the possibility of obtaining "dead" polymer chains as a side-product. The PS—COO⁻ and the PS—SO₃⁻ may be obtained by terminating a living anionic PS with succinic anhydride or 1,3-propanesultone, respectively.

Formation and Basic Characterization of q-BCPs in Solution.

Bifunctional monomers and their corresponding end-capped polymers will be mixed at different ratios in a non-selective, aprotic solvent (e.g., cyclohexane, chloroform, ether, THF, DMSO, and toluene), leading to the formation of q-BCPs. Diffusion-ordered NMR spectroscopy and light scattering experiments (SLS and DLS) will be employed to give initial evidence for the increase in molecular weight of the conventional polymer with increasing monomer concentration.

The q-BCP systems are analyzed in solution prior to exploring their properties in the melt. A strong indication for the formation of block copolymers is the shortening of supramolecular polymer chains, which indicates that the functionalized PS acting are indeed acting as chain stoppers. The expected outcome is reduced viscosity compared to an analogous blend made with non-functionalized ("dead") PS at the same PS/supramolecular monomer ratios.

Thermal annealing (under nitrogen) of bulk samples formed by evaporating the solvent allows them to reach equilibrium. The thermal transitions of annealed samples with different endcapped polymer/supramolecular monomer ratios is analyzed by scanning differential calorimetry (DSC). Equilibrated bulk samples quenched from different temperatures is studied by small-angle X-ray Scattering (SAXS) and transmission electron microscopy (TEM). A systematic study of the morphological dependence on temperature and the mole fraction of the conventional polymer chain stopper (x) allows to map the phase space of the q-BCPs and compare to the simulation results.

Figure 2:
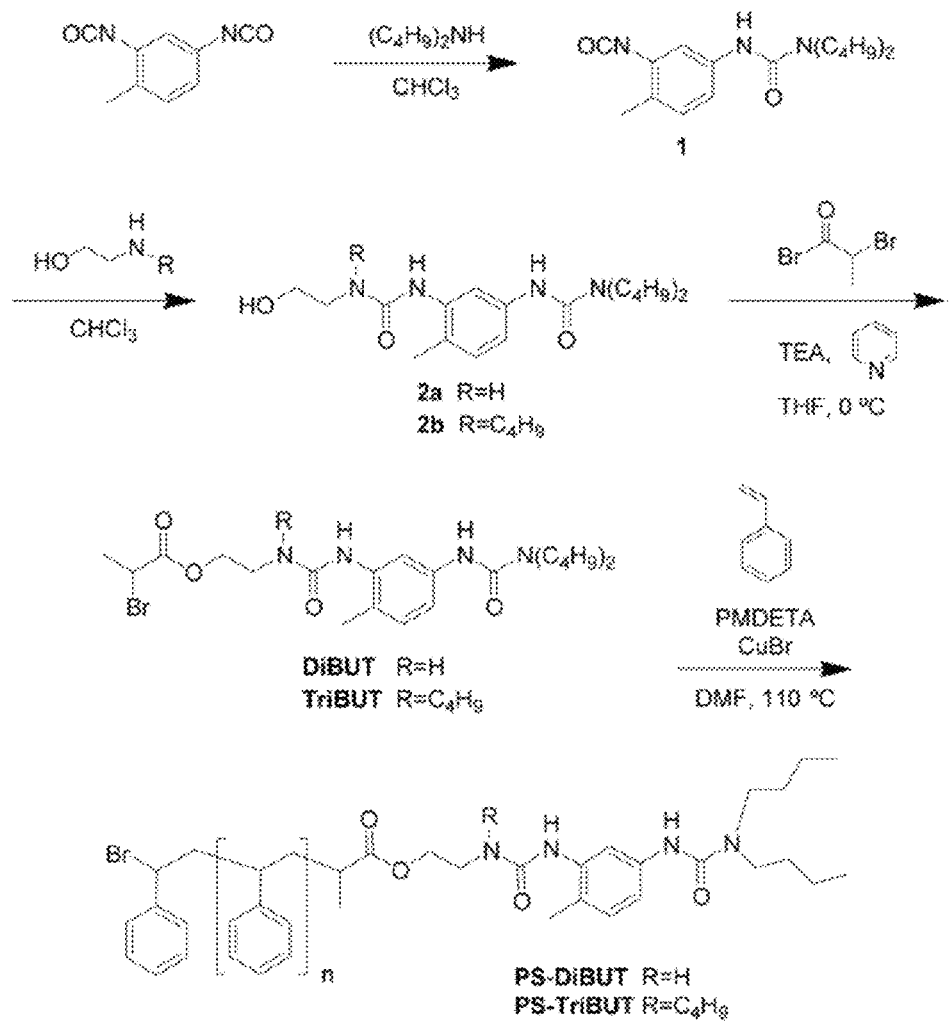
FIG. 2 shows a synthesis scheme for the formation of DiBUT and TriBUT-capped PS.

Polystyrene (PS) was polymerized by atom transfer radical polymerization (ATRP) from modified initiators to ensure that every chain is capped with the end-functionality. FIG. 2 shows the synthesis of two types of end-functionalized polystyrenes, containing either two or three butyl substituents on the urea groups (denoted as PS-DiBUT and PS-TriBUT, respectively), and Table 1 summarizes their data, including that of a nonfunctionalized PS used for comparison throughout this study. As these capped polymers serve as chain stoppers for poly(EHUT), the comparison between these end-functionalities was meant to provide insights into the mode of interaction and the effectiveness of chain stopper action on the poly(EHUT) chains.

TABLE 1

Polymerization data of the covalent (PS-based) polymers

| Polymer | Polymerization time (min) | Conversion (%) | $M_n$ (kDa)[a] | PDI |
|---|---|---|---|---|
| PS-DiBUT 2k | 15 | 3.5 | 2.5 | 1.12 |
| PS-DiBUT 4k | 30 | 22 | 3.9 | 1.14 |
| PS-DiBUT 6k | 45 | 48 | 6.0 | 1.18 |
| PS-DiBUT 7k | 60 | 49 | 7.0 | 1.24 |
| PS-TriBUT 4k | 30 | 22 | 3.9 | 1.22 |
| PS 4k | | | 4.2 | 1.38 |

[a] According to SEC with PS standards.

Figure 3A:
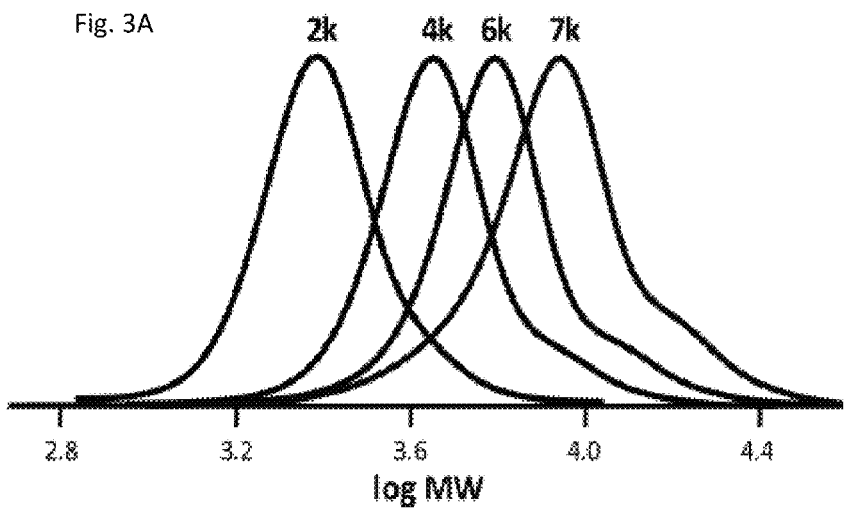
FIG. 3A shows the GPC traces of PS-DiBUT polymers obtained after different polymerization times.
Figure 3B:
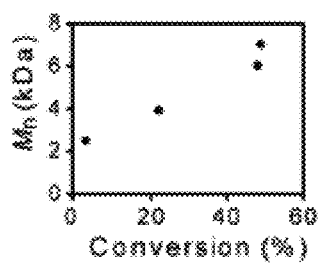
FIG. 3B shows the dependence between the resulting Mn and the conversion.

FIG. 3 shows the GPC traces of PS-DiBUT polymers obtained after different time intervals. The linear dependence between the number-average molecular weight (Mn) and the conversion as well as the relatively narrow molecular weight distributions attest to the controlled nature of the ATRP polymerization using the DiBUT-modified initiator. Nonetheless, polymers obtained under extended polymerization times exhibit bimodal molecular weight distributions with an increasing fraction of a high molecular weight component (from 13% for the 2 k polymer to 21% in the 7 k polymer), featuring molecular weights that are approximately double the molecular weight of the majority fraction. These higher molecular weight fractions are attributed to undesired coupling reactions, which terminate the growing chains and double their lengths. It should be noted that such a termination reaction is not detrimental for the purpose of preparing a q-BCP, since it gives rise to chains that are capped at both ends with the supramolecular unit (i.e., of the structure DiBUT-PS-DiBUT). Such polymers should still act as chain stoppers for poly(EHUT), giving rise to multiblock q-BCPs with the same compositions as the intended diblock q-BCPs. Nevertheless, to strike a compromise between the desire to avoid this complication and the need to use as long a polymer as possible (to reduce the influence of the endfunctionality on the general nature of the polymer), PS-DiBUT and PS-TriBUT were used to obtained after 30 min of polymerization, featuring Mn of ca. 4 kDa.

Figure 4:
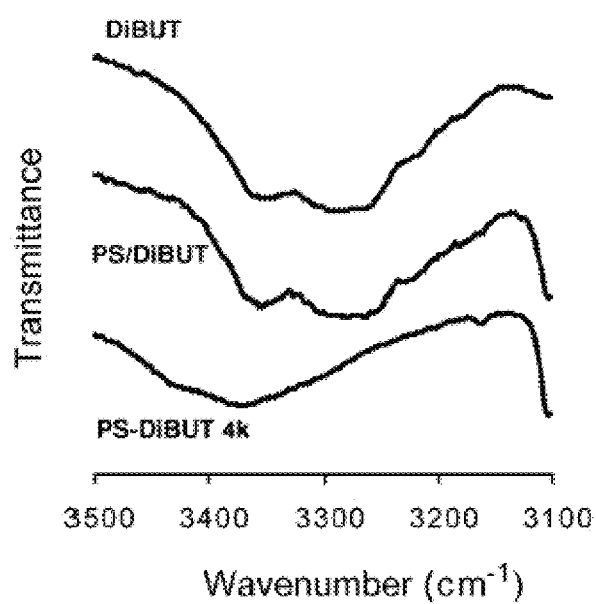
FIG. 4 shows the N—H stretching region in the IR spectra of the DiBUT initiator, PS/DiBUT mixture, and the end-functionalized polymer PS-DiBUT 4 k. Curves are offset for clarity.

The PS-DiBUT and PS-TriBUT were characterized by infrared (IR) and NMR spectroscopy. FIG. 4 shows a comparison between the IR spectra of the PS-DiBUT, the DiBUT-modified initiator (denoted as DiBUT for brevity), and a mixture of the latter with non-end-functionalized PS (denoted as PS/DiBUT). While the N—H stretching modes of the pure initiator and the PS/DiBUT appear to be identical, there is a noticeable shift in the NH vibration peaks in the case of the end-functionalized polymer (PS-DiBUT), indicating that the DiBUT functionality is indeed attached to the PS chain.

Figures 5A, 5B:
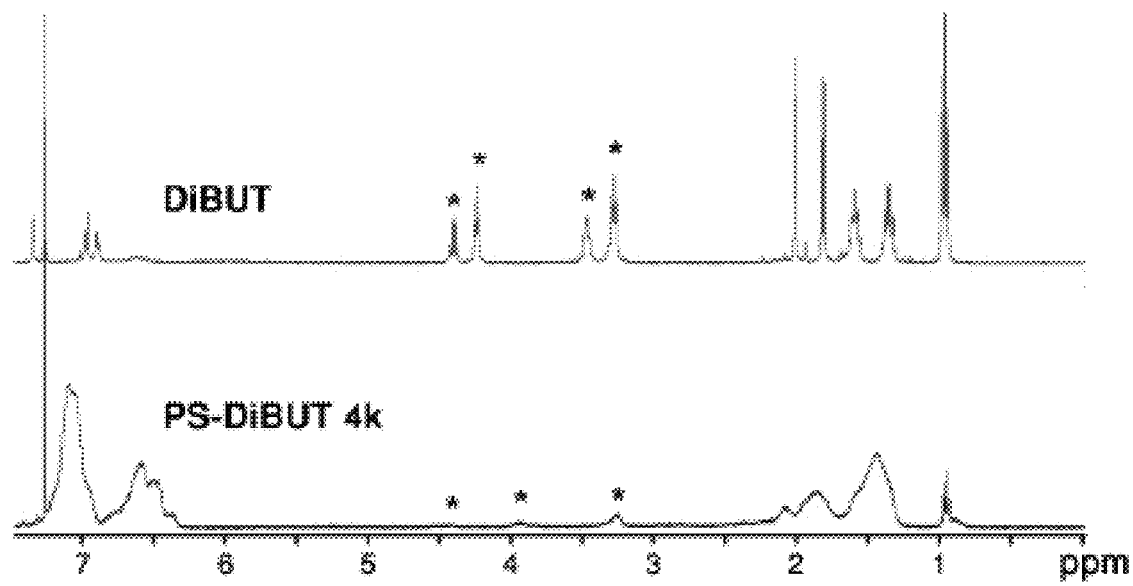
FIGS. 5A-5B $^1$H-NMR of the DiBUT initiator (FIG. 5A) and PS-DiBUT (FIG. 5B) 4 k. Peaks indicative of the DiBUT functionality are marked with asterisks.

Further support for the presence of the DiBUT functionality terminating the PS chains was obtained from NMR measurements performed on the PS-DiBUT (FIG. 5). Evidently, the methylene proton peaks in the region of 3-4.5 ppm, which are indicative of the DiBUT functionality, appear also in the spectrum of the PS-DiBUT. A similar spectrum was obtained for the analogous PS-TriBUT. The line broadening observed for these peaks, as well as the failure to obtain polymers in polymerization attempts of styrene performed under the same conditions in the absence of the DiBUT initiator, preclude the option of a mixture of un-reacted initiator and self-polymerized PS.

Formation of the q-BCP in Solution.

Compelling evidence for the formation of q-BCP in solution was obtained from viscosity measurements performed on solutions containing varying amounts of EHUT and employing different solvent compositions. In these experiments, the measured viscosities of solutions containing EHUT with either PS-DiBUT or PS-TriBUT (denoted as PS-DiBUT/EHUT and PS-TriBUT/EHUT, respectively) were compared to solutions containing EHUT and nonfunctionalized PS (denoted as PS/EHUT), and were normalized to the solvent viscosity. This comparison enabled us to study the functioning and efficiency of the supramolecular end-functionality as a chain stopper for poly(EHUT).

Figures 6A, 6B, 6C:
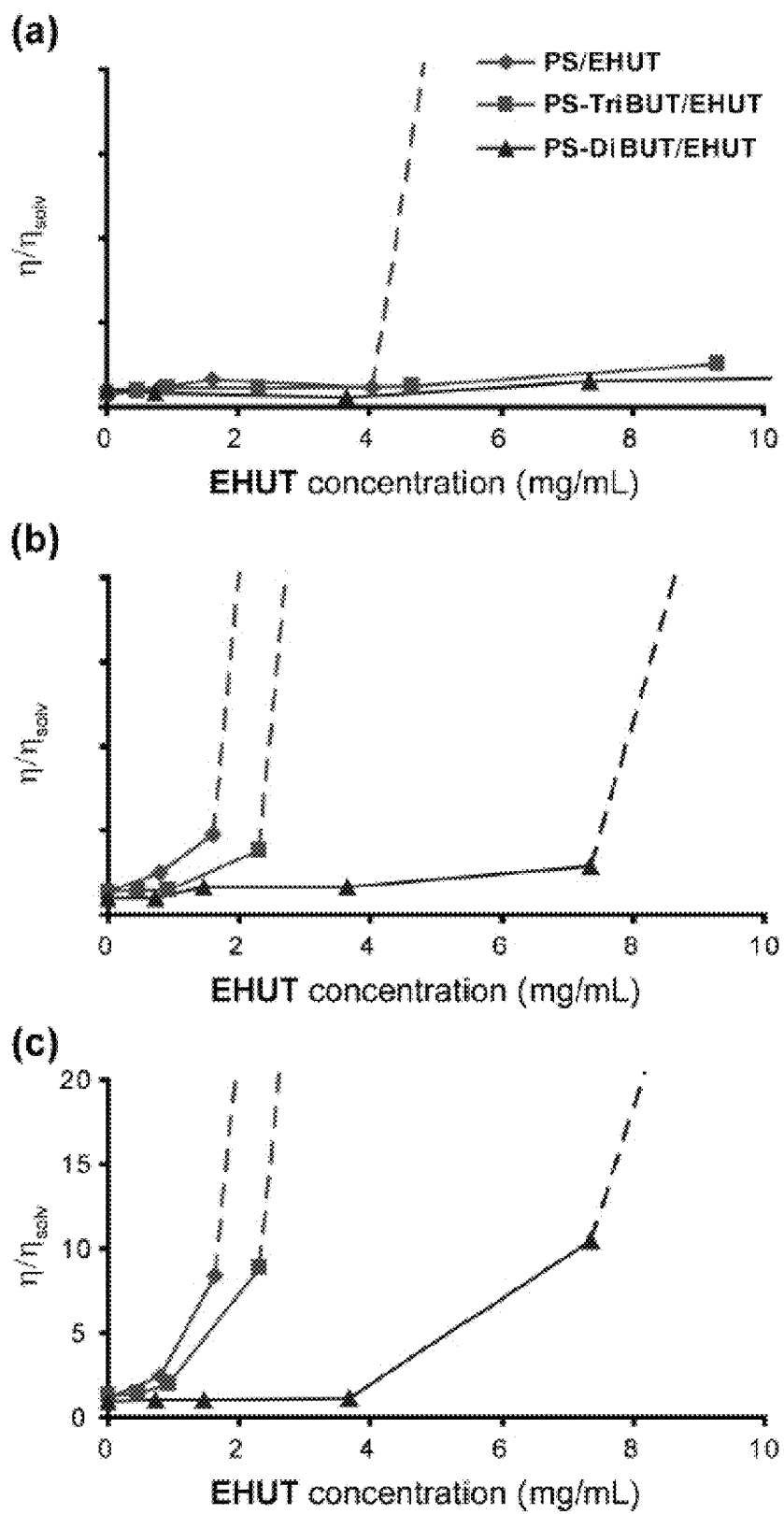
FIG. 6A-6C Relative viscosities measured for the PS/EHUT, PS-DiBUT/EHUT, and PS-TriBUT/EHUT systems at constant PS-derivative concentration (7.4 mg/mL) and different EHUT concentrations dissolved in different solvent compositions.

FIG. 6a shows the relative viscosities measured for the three types of systems as a function of EHUT concentration in 3:7 toluene:chloroform solutions at a constant concentration of the PSderivative (i.e., the PS, PS-TriBUT, or PS-DiBUT in the respective system). All three systems exhibit rather low and constant relative viscosities up to EHUT concentration of 4.0 mg/mL. This suggests that in this solvent composition, at low EHUT concentrations the poly(EHUT) chains formed are rather short and hence do not contribute to a considerable increase in viscosity above that of the solvent. This situation remains the same for the solutions containing the end-functionalized PS-DiBUT and PSTriBUT polymers also at higher EHUT concentrations. In contrast, the viscosities of the PS/EHUT system with EHUT concentration exceeding 8 mg/mL become remarkably high (beyond the measurement range of the viscometer), possibly indicating a transition from the short filament structure to the long tubular structure. 12d,f,h Since non-functionalized PS cannot serve as a chain stopper for poly(EHUT), this indicates that at EHUT concentrations exceeding 8 mg/mL the unperturbed poly(EHUT) chains grow to substantial lengths. The sharp contrast between the behavior of the systems containing PS-DiBUT and PS-TriBUT and the behavior of the control system employing nonfunctionalized PS indicates an effective chain stopper effect displayed by the PS-DiBUT and PS TriBUT, which result in shorter poly(EHUT) chains (which possibly results also a larger fraction of the filament form). The inevitable consequence of this effective chain stopper functioning of PS-DiBUT and PS-TriBUT is the formation of q-BCPs architectures.

Increasing the toluene fraction in the solvent composition was expected to result in longer poly(EHUT) chains (with an additional change in morphology from short filaments to long tubular structures). FIG. 6b,c indeed show this effect by the general trend of increasing relative viscosities already at lower EHUT concentrations for all systems. Remarkably, under these conditions a difference between the DiBUT and the TriBUT end-functionalities was observed, where it becomes clear that the DiBUT functionality serves as a much better chain stopper for poly(EHUT) than the TriBUT functionality. Considering the chemical differences between the DiBUT and TriBUT functionalities, this provides evidence that with these macromolecular chain stoppers, the chain stopping effect is achieved mostly through the NH groups, acting as hydrogen bond donors, rather than the carbonyl groups. This finding seemingly stands in contrast to recent findings on molecular chain stoppers for EHUT, where it was shown that the carbonyl groups are responsible to the chain stopping effect and the involvement of existing NH groups may only reduce this effect by making the chain stopper act as a supramolecular comonomer. 12a,g More information is required to elucidate the reason for this behavior; it was hypothesized that the PS chain tethered to the chain stopper functionality contributes to its ability to serve as a chain stopper, especially in the case of the tubular form of poly (EHUT), where it may disrupt the supramolecular assembly.

Formation of the q-BCP in the Melt

Figures 7A, 7B:
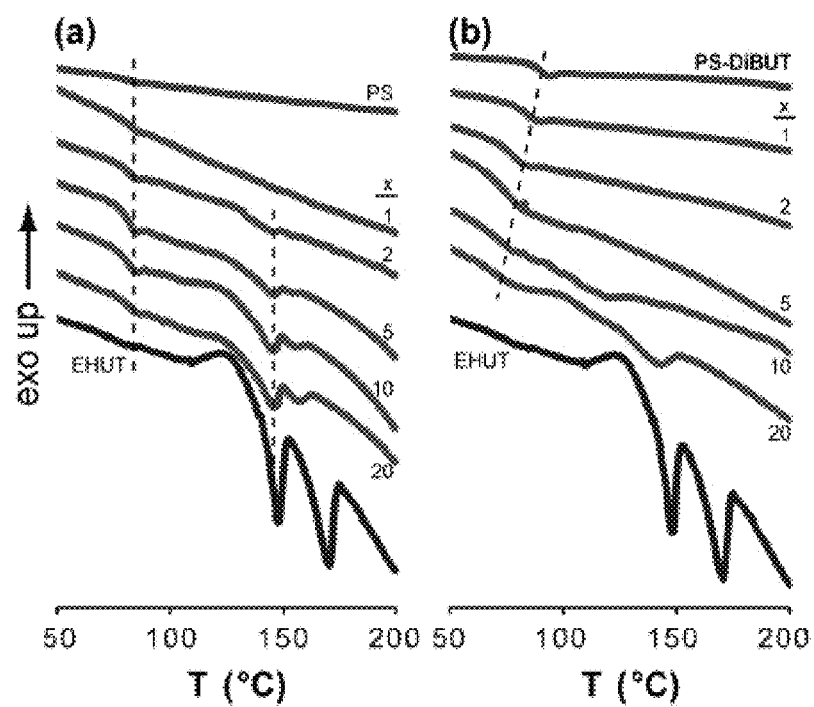
FIGS. 7A-7B shows the DSC curves of blends of PS and EHUT at different EHUT:PS ratios (x) (FIG. 7A), and PS-DiBUT 4 k and EHUT at different EHUT:PS-DiBUT ratios (FIG. 7B). For comparison, the curves of the neat PS and PSDiBUT 4 k are provided on top (green) and the neat EHUT curve is provided on the bottom (blue). Curves are offset for clarity.

Differential scanning calorimetry (DSC) measurements performed on the control system, PS/EHUT, reveals no significant change in the $T_g$ of the PS caused by the increasing amounts of EHUT added to the blend (FIG. 7a). In addition, two melting transitions attributed to EHUT appear already from EHUT:PS mole ratio of 2. The low temperature melting transition occurs at nearly the same temperature as the corresponding transition in pure EHUT regardless of the EHUT concentration in the blend. The high temperature melting transition in the blends occurs at lower temperatures than the corresponding transition in pure EHUT, but their temperatures increase steadily with the EHUT:PS ratio in the direction of the $T_m$ of the corresponding transition in pure EHUT. These observations indicate a small influence of the EHUT phase on the PS phase and vice versa, leading to the conclusion that these control blends are phase separated on a macroscopic scale, where the shifts in the high Tm transitions in these blends is attributed to the increasing size of pure EHUT domains with EHUT:PS ratios. In sharp contrast to these findings, PSDiBUT/EHUT blends exhibit a strong decrease of the $T_g$ of the PS-DiBUT with increasing EHUT:PSDiBUT ratios. Additionally, only the low $T_m$ transition of EHUT appears, and only at high EHUT:PSDiBUT mole ratios. These observations demonstrate strong mutual influence between PS-DiBUT and EHUT, resulting from an interaction between EHUT and the DiBUT end group, and, consequently, the formation of a q-BCP. The reduction in $T_g$ of the PS domains and the absence of the high temperature melting transition suggests the formation of rather small PS and poly (EHUT) domains, respectively, which are consistent with a microphase-separated structure typical to a block copolymer.

Effect of Functionalized PS Chain Stoppers on the Molecular Weight of Poly(EHUT): Coarse-Grained Simulations To illustrate qualitatively the effect of the functionalized PS (i.e. the PS-DiBUT or the PS-TriBUT) as chain stoppers on the molecular weight distribution, a simple model system was considered with similar properties as the experimental system using hybrid density functional theory (DFT)/particle-based simulations. This mesoscopic modeling strategy combines concepts from classical DFT of liquids with standard particle-based simulation techniques (e.g. Monte-Carlo simulations). It has been extensively discussed in earlier publications and has been applied to supramolecular polymers. nPS PS-homopolymer chains were dissolved in nEHUT EHUT molecules so that nEHUT/nPS=19, which corresponds to the limit of high EHUT concentrations. Each PS homopolymer is described through a bead-spring model with NPS=13 coarse-grained segments, while each EHUT molecule is represented by a single coarse-grained bead. In the case of non-functionalized PS, the EHUT monomers can reversibly bind only between themselves, forming a polydisperse melt of linear poly(EHUT) homopolymers (h-EHUT) mixed with PS homopolymers. When modeling functionalized PS, the EHUT monomers was allowed to associate with one of the two termini of the PS chains as well. Thus, in addition to the h-EHUT polymers, the system contains PS-EHUT diblock and PS-EHUT-PS triblock copolymers. The energy due to the connectivity of the chains is given by:

$$H_b = \sum_{bonds} \left[ E_b + \frac{3k_B T |\Delta r|^2}{2b^2} \right]$$

where the summation is performed over all the bonds in the system (covalent and supramolecular). $\Delta r$ denotes the distance of the neighbors forming the considered bond, b sets the characteristic length scale of the segments (PS and EHUT), and $E_b$ represents the bonding strength of the supramolecular association. The systematic mapping of the strength of the EHUT/EHUT, EHUT/DiBUT, and the EHUT/TriBUT bonding on the phenomenological $E_b$ parameter is out of the scope of the simulations performed within the current work. $E_b=-6$ $k_BT$, was used which corresponds to a strong supramolecular association and is representative of the situation encountered in the experimental systems. The non-bonded interactions are described through the functional:

$$\frac{H_{nb}}{\rho_o k_B T} = \frac{\kappa_0}{2} \int dr [\hat{\phi}_{PS}(r) + \hat{\phi}_{EHUT}(r) - 1]^2$$

where $\hat{\phi}_{PS}(r)$ and $\hat{\phi}_{EHUT}(r)$ are the local volume fractions of the PS and the EHUT monomers calculated directly from the coordinates of the corresponding monomers with the help of a grid. The quantity $\rho_0=(N_{PS}n_{PS}+n_{E-HUT})/V \approx 23.73 b^{-3}$ stands for the average number density of the monomers while $\kappa_0$ controls the compressibility of the liquid. $\kappa_0 \approx 1.56$, was employed which is sufficiently large to suppress fluctuations of the total density on the mesoscale. A cubic system of size of $27.83 b$ with periodic boundary conditions is considered in the following simulations.

Figures 8A, 8B:
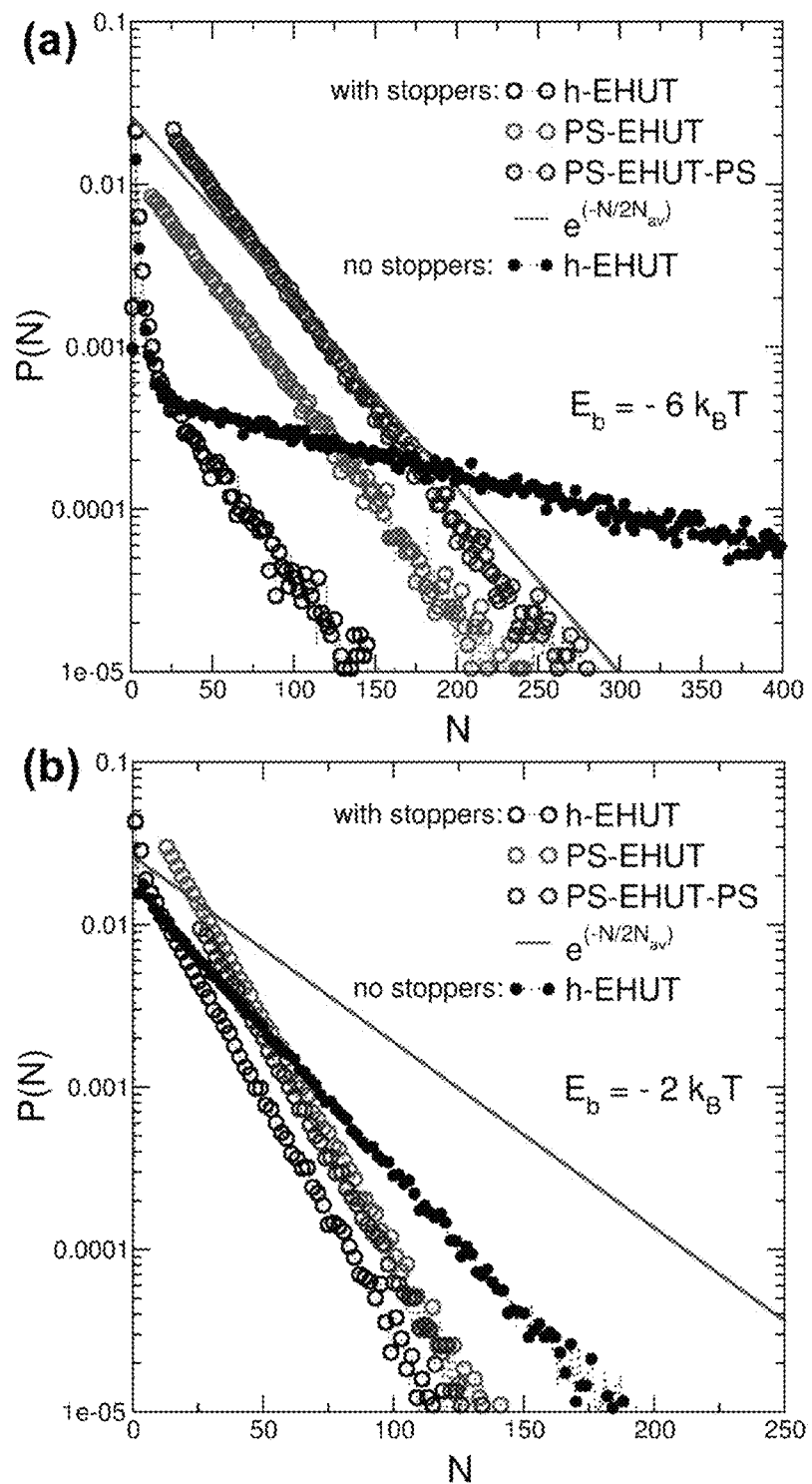
FIG. 8A-8B shows the semi-logarithmic plots depicting the molecular weight distributions of the supramolecular EHUT-containing chains as obtained by hybrid MT/particle-based simulations (h-EHUT, PS-EHUT and PS-EHUT-PS). The red solid line marks a simple theoretical prediction for the molecular weight distribution in the case of end-functionalized PS, derived under the assumption that only PS-EHUT-PS triblocks are formed. The energy of bond formation is $E_b=-6$ kBT (FIG. 8A); $E_b=-2$ kBT.

The polymer conformations in the supramolecular system are sampled using "smart Monte Carlo" monomer displacements, while the chain connectivity is altered with the help of supramolecular Monte Carlo moves. FIG. 8a shows a semi-logarithmic plot of the molecular weight distribution (MWD) of the supramolecular poly(EHUT)-containing chains in systems involving either nonfunctionalized (solid symbols) or functionalized (open symbols) PS. In the "no-stoppers" case involving only non-functionalized PS chains, the supramolecular assemblies include only h-EHUT macromolecules, which are markedly longer than the h-EHUT homopolymers, PS-EHUT diblocks, and PS-EHUT-PS triblocks observed in the presence of functionalized-PS. This is manifested by the significant difference in the slope of the decay of the MWD in the two cases. The solid red line corresponds to a simple theoretical prediction for the MWD in the limit where $E_b$ is sufficiently high so that each supramolecular chain has two stoppers (i.e., when only PS-EHUT-PS triblocks are formed).

In this case one can assume an exponential MWD of the supramolecular EHUT part: $P(N)=<N>^{-1}e^{-N/<N>}$. Taking into account that in these simulations there is an average of 19 EHUT molecules per functionalized PS chain stopper ($N_{av}$), $<N>=2N_{av}=38$ was obtained. This simple analytical argument follows the simulation results closely; the minor discrepancy stems from the fact that for $E_b=-6k_BT$, not all supramolecular chains are terminated by two stoppers, i.e. h-EHUT chains and PS-EHUT diblocks are still present in the system. To highlight the influence of the strength of the supramolecular association on the effect of chain stoppers on the MWD, FIG. 8b illustrates the MWD for an analogous system with $E_b=-2k_BT$.

In this case the effect of the functionalized PS on the stoichiometry of the supramolecular system is much less pronounced. The system contains more PS-EHUT diblocks than PS-EHUT-PS triblocks (manifested by the relative position of the plots of the corresponding MWD), emphasizing the fact that there are many supramolecular chains having only one stopper and one "dangling" active end.

EXPERIMENTAL SECTION

Instrumentation

NMR measurements were performed on a 400 MHz Bruker spectrometer. Infrared (IR) measurements were performed at room temperature on Nicolet 380 FT-IR spectrometer (Thermo Scientific) using KBr disks (1 mm diameter). Gel permeation chromatography (GPC) was performed using a Thermo SpectraSYSTEM HPLC equipped with a P200 pump, SDV linear M column (5μ particle size, 8×300 mm; Polymer Standards Service) and a SpectraSYSTEM RI-150 detector. The column was calibrated against PS standards (PSS ReadyCal kit), and samples were analyzed at a flow rate of 1 mL/min using 5% triethylamine in THF as the mobile phase. Glass transition temperatures were determined using differential scanning calorimetry (DSC), performed on 5-12 mg samples under continuous nitrogen purge (50 mL/min) on a Mettler Toledo DSC822 (Greifensee, Switzerland). Data were collected in the range of −50-200° C. at a heating scan rate of 10° C./min, and represent the second heating cycle. Viscosity measurements were performed at room temperature on a DV-II+ viscometer (Brookfield, Middleboro, Mass., USA) at a shear rate of 264 $s^{-1}$.

Synthesis

All reagents were purchased from either Acros or Sigma-Aldrich and were used without further purification, apart from styrene, which was dried for two days on calcium hydride and distilled before use.

1:

Dibutylamine (0.957 mmol) was dissolved in 30 mL dry $CHCl_3$ and slowly added under nitrogen atmosphere to toluene-2,4-diisocyante (11.48 mmol) dissolved in 40 mL of dry $CHCl_3$. The solution was let to stir overnight. Column chromatography ($SiO_2$, 4:1 hexane:ethyl acetate, $R_f=0.48$) provided 1.5 g (50%) of the titled compound as a yellow-white solid, m.p. 88.3° C. The isomer resulting from the modification of the other isocyanate group was obtained in minor quantities; structural verification of the major isomer as 1 was obtained from NOE Spectroscopy.

$^1$H NMR ($CDCl_3$) δ 7.29 (d, J=2 Hz, 1H, OCN—C=CH), 7.05 (d, J=8.4 Hz, 1H, Me-C=CH), 7.00 (dd, J=8.2, 2.2 Hz, 1H, Me-C=CH—CH), 6.21 (br s, 1H, N—H), 3.27 (t, J=7.6 Hz, 4H, N—$CH_2$), 2.25 (s, 3H, Ph-$CH_3$), 1.60 (m, 4H, N—$CH_2CH_2$), 1.36 (m, 4H, $CH_2CH_3$), 0.96 (t, J=7.4 Hz, 6H, $CH_2CH_3$).

Compounds 2a and 2b: 2-aminoethanol or 2-butylaminoethanol (7.42 mmol) were added to a solution of 1 (4.94 mmol) in 40 mL dry $CHCl_3$ to obtain compound 2a or 2b, respectively. The mixture was stirred for 4 h under nitrogen. After solvent evaporation the product was dissolved in dichloromethane, washed with water, NaHCO3, and brine, and dried over sodium sulfate. Evaporation of the solvent provided a yellow-white solid product of either 2a (1.35 g, 75%, m.p. 77.5° C.) or 2b (1.55 g, 75%, m.p. 112° C.)

2a:

1H NMR ($CDCl_3$) δ 7.67 (d, J=2.0 Hz, 1H, NH—C=CH—C—NH), 7.02 (d, J=8.0 Hz, 1H, Me-C=CH), 6.68 (dd, J=8.0, 2.2 Hz, 1H, Me-C=CH—CH), 6.31 (br s, 1H, NH), 6.24 (br s, 1H, NH), 5.93 (br s, 1H, NH—$CH_2$), 4.20 (t, J=6.3 Hz, 1H, OH), 3.74 (dd, J=9.7, 5.9 Hz, 2H, HO—$CH_2$), 3.40 (dd, J=9.6, 5.5 Hz, 2H, HO—$CH_2CH_2$), 3.28 (t, J=7.6 Hz, 4H, N—$CH_2$), 2.06 (s, 3H, Ph-$CH_3$), 1.60 (m, 4H, N—$CH_2CH_2$), 1.38 (m, 4H, $CH_2CH_3$), 0.97 (t, J=7.3 Hz, 6H, $CH_2CH_3$).

2b:

1H NMR (CDCl$_3$) δ 7.49 (s, 1H, NH—C═CH—C—NH), 7.43 (br s, 1H, NH), 7.21 (d, J=8.8 Hz, 1H, Me-C═CH—CH), 6.99 (d, J=8.0 Hz, 1H, Me-C═CH), 6.33 (br s, 1H, NH), 3.75 (m, 2H, HO—CH$_2$), 3.43 (m, 2H, HO—CH$_2$CH$_2$), 3.25 (m, 6H, N—CH$_2$), 2.08 (s, 3H, Ph-CH$_3$), 1.58 (m, 6H, N—CH$_2$CH$_2$), 1.34 (m, 6H, CH$_2$CH$_3$), 0.96 (m, 9H, CH$_2$CH$_3$).

DiBUT and TriBUT:

To a 40 mL THF solution of either 2a or 2b (3.56 mmol), triethylamine (5.35 mmol) and pyridine (1.16 mmol) were added under nitrogen atmosphere to obtain DiBUT or TriBUT, respectively. After 10 min of stiffing the flask was cooled using an ice bath, and stirring was continued for additional 10 min 2-Bromopropionyl bromide (5.35 mmol) was added and the resulting cloudy solution was stirred overnight. The crude product was dried, dissolved in dichloromethane, washed with water, NaHCO$_3$ and brine, dried over sodium sulfate, and purified by flash chromatography (SiO$_2$, 1:2 hexane:ethyl acetate, Rf=0.25) to yield as a white solid (DiBUT: 400 mg, 20%, m.p. 117.5° C.; TriBUT: 450 mg, 25%, m.p. 76.0° C.).

DiBUT:

1H NMR (CDCl$_3$) δ 7.30 (d, J=2 Hz, 1H, NH—C═CH—C—NH), 6.96 (br s, 1H, NH), 6.86 (d, J=8.4 Hz, 1H, Me-C═CH), 6.77 (dd, J=8.0, 2.0 Hz, 1H, Me-C═CH—CH), 6.37 (br s, 1H, NH), 6.21 (t, J=5.6 Hz, 1H, NH—CH$_2$), 4.36 (q, J=6.9 Hz, 1H, Br—CH), 4.19 (t, J=5.8 Hz, 2H, O—CH$_2$), 3.40 (m, 2H, O—CH$_2$CH$_2$), 3.26 (t, J=7.6 Hz, 4H, N—CH$_2$) 1.85 (s, 3H, Ph-CH$_3$), 1.80 (d, J=7.2 Hz, 3H, CH$_3$CH—Br), 1.57 (m, 4H, N—CH$_2$CH$_2$), 1.34 (m, 4H, CH$_2$CH$_3$), 0.96 (t, J=7.2 Hz, 6H, CH$_2$CH$_3$).

TriBUT:

1H NMR (CDCl$_3$) δ 7.64 (d, J=2.4 Hz, 1H, NH—C═CH—C—NH), 7.32 (dd, J=8.1, 2.0 Hz, 1H, Me-C═CH—CH), 7.07 (d, J=8.8 Hz, 1H, Me-C═CH), 6.56 (br s, 1H, NH), 6.33 (br s, 1H, NH), 4.37 (m, 3H, Br—CH+O—CH$_2$), 3.64 (m, 2H, O—CH$_2$CH$_2$), 3.33 (t, J=7.8 Hz, 2H, N—CH$_2$), 3.23 (t, J=7.6 Hz, 4H, N—CH$_2$), 2.20 (s, 3H, Ph-CH$_3$), 1.82 (d, J=6.9 Hz, 3H, CH$_3$CH—Br), 1.63 (m, 6H, NCH$_2$CH$_2$), 1.37 (m, 6H, CH$_2$CH$_3$), 0.96 (m, 9H, CH$_2$CH$_3$).

Polymerization.

CuBr (0.048 mmol), PMDETA (0.096), styrene (19.14 mmol) and DiBUT or TriBUT (0.048 mmol) dissolved in 0.5 mL DMF were inserted into a pressure tube. The tube was connected to a high vacuum line, and degassing using 3 cycles of freeze-pump-thaw was performed.

Purified nitrogen was then added to the frozen mixture and the tube was closed under slightly less than 1 atm. The tube was inserted into an oil bath pre-heated to 110° C. for different time intervals (from 15 to 60 min), after which the resulting polymer was cooled to ambient temperature, opened to the atmosphere, diluted with dichloromethane, and precipitated in methanol. The precipitation procedure was repeated until the polymer obtained was white.

Synthesis of Lithium Sulfonatopolystyrene (Macromolecules 1991, 24, 4515-4522. 2) Macromolecules 2003, 36, 8433-8439). Anionic polymerization of styrene with sec-BuLi as initiator was carried out in THF at −78° C. in all glass sealed reactor, using break-seals and standard high vacuum techniques. Poly(styryl)lithium was end capped with 1,1-diphenylethylene (5 times the initiator) to produce the corresponding 1,1-diphenylalkyllithium quantitatively. Treating diphenylethylene end capped polystyrene with at least a 1.5 fold excess (to the initiator) of 1,3-propanesultone at 25-30° C., overnight yields 93% of sulfonated polymer.

Sample Preparation for Viscosity and DSC Measurements

Mother solutions of EHUT and PS, PS-DiBUT and PS-TriBUT polymer were prepared in dry CHCl$_3$, stirred for 3 hr, and filtered. Portions of the EHUT solution and the desired PS-derivative solution were mixed in chloroform to obtain 7 mL solutions of 0.5 wt % (7.4 mg/mL) concentration of the PS-derivative and different mole ratios between EHUT and the PS-derivative (x; 0<x<20). The mixtures were stirred for 16 hr. Prior to the viscosity measurements, the chloroform was evaporated and the mixture was further dried under high vacuum for 2 d, dissolved in 7 mL of CHCl$_3$:THF at the desired volume fraction (either 3:7, 5:5, or 7:3), and stirred for 2.5 hr. Prior to DSC measurements, solution mixtures were evaporated and dried for 3 d under high vacuum, weighed into standard aluminum pans, and sealed.

Assembly of Block Co-Polymer Films on Substrates

In general, to integrate block copolymer material into the process of directed assembly, a number of criteria should be met simultaneously: 1) one of the blocks of the copolymer and selective regions (e.g. guiding stripes or spots) of the chemical surface pattern must exhibit strong and preferential wetting behavior, 2) the interspatial regions between the guiding pattern must be tuned chemically to be either strongly wet, weakly wet, or non-preferentially wet by blocks of the copolymer depending of the specific patterning process and objectives, 3) the materials used to create the chemical patterns must be amenable for commercially relevant process flows (e.g. track processing), 4) the block copolymer must be induced to assemble in commercially relevant time frames (seconds to minutes), and 5) the assembled block copolymer and chemically patterned layer must be able to serve as an etch mask for pattern transfer to the underlying substrate.

Structure Formation on Featureless Substrates.

The behavior of q-BCPs is investigated in thin films fabricated by spin coating onto silicon and silicon oxide wafers. In this case, solvent annealing provides another suitable option for relaxing the films into their equilibrium structures. The vapors of aprotic solvents such as chloroform and toluene is used for solvent annealing. The resulting structures were studied as a function of conventional polymer length, its mole fraction (x), and the film thickness, and compared to analogous blends prepared with dead PS. The periodicity of the structures obtained is measured by atomic force microscopy (AFM), and possibly also with grazing incidence SAXS (to study the kinetics of structure formation in the thin films). Additional parameters that are tested include the effect of substrate chemistry and annealing conditions (type of solvent and duration of annealing).

Structure Formation on Periodically Patterned Substrates.

The main procedure for fabricating patterned PS brushes involves the anchoring of hydroxy-terminated polystyrene (PS—OH) to a silicon substrate, coating with a thin film of photoresist, exposure to electron beam to create the periodic pattern, oxygen plasma treatment to chemically modify the exposed PS domains and render them strongly polar, and removal of the remaining photoresist by solvent rinses, leaving behind a chemically nano-patterned surface. First, periodic stripe patterns is replicated with fixed periods in the vicinity of the period found in the studies on featureless substrates. Stripe patterns differing in periodicity above and below the periodicity found for q-BCP samples annealed on featureless substrates allows the study the tolerance of these systems to difference between the substrate and bulk periodicity, and to compare it to the results obtained with conventional block copolymer systems. In the next step, the ability of q-BCP systems to simultaneously replicate a pattern that includes periodic stripes with different periodicities is tested.

Experiments on such substrates are compared to analogous conventional block copolymer/homopolymer blends as well as "dead" homopolymer/supramolecular polymer blends.

Structure Formation on Non-Regular Patterns.

The replication of simple non-regularities and implemented defects such as a nested array of bends at different angles, and test the performance of q-BCP are compared to ternary blends. q-BCP systems that replicate such simple non-regularities.

Results

Films consisting of fixed 1 wt % PS-DiBUT concentration and varying amounts of EHUT were casted resulting in interesting morphologies, but also very high (>100 nm) and considerably varying film thicknesses. As the film thickness is a determining factor for the resulting morphology, the constant concentration of both the PS-DiBUT and EHUT components (0.2 wt % in total) was reduced and maintained while varying the ratios between them. This produced a constant film thickness of about 30 nm.

Figures 9A, 9B, 9C, 9D, 9E, 9F:
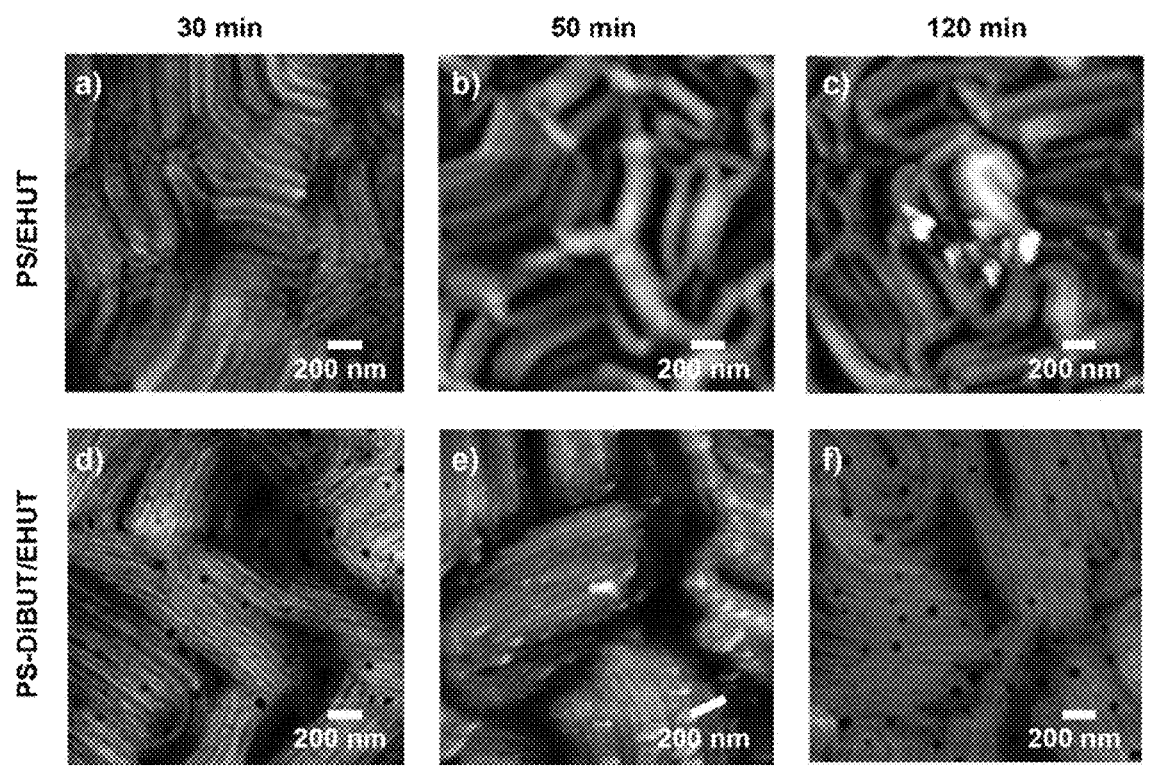
FIGS. 9A-9F are AFM height images of thin films (~30 nm) of: (9A-9C) PS/EHUT 1:9; (9D-9F) PS-DiBUT/EHUT 1:9. Films were annealed in chloroform vapor for: (9A, 9D) 30 min; (9B, 9E) 50 min; (9C, 9F) 120 min.
Figures 10A, 10B, 10C, 10D:
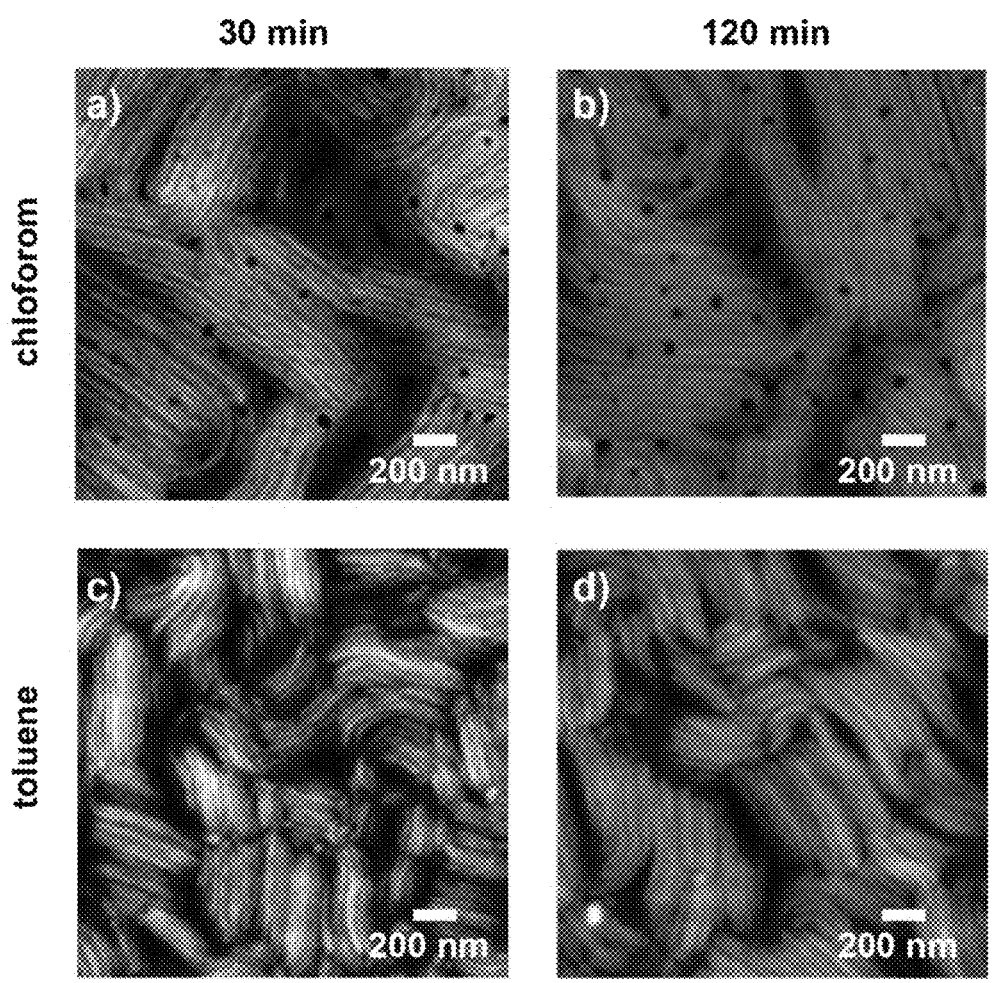
FIGS. 10A-10D are AFM height images of thin films (~30 nm) of PS-DiBUT/EHUT 1:9 annealed in: (10A, 10B) chloroform vapor; (10C, 10D) toluene vapor, for: (10A, 10C) 30 min; (10B, 10D) 120 min.
Figures 11A, 11B, 11C, 11D:
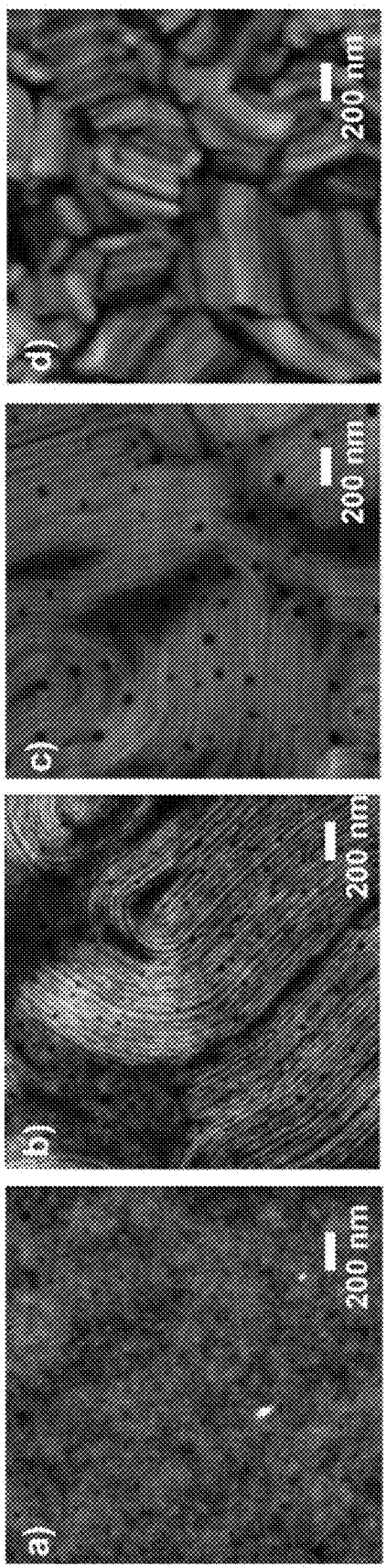
FIGS. 11A-11D are AFM height images of thin films (~30 nm) of PS-DiBUT/EHUT annealed in chloroform vapor for 120 min with varying EHUT contents: (11A) 50%; (11B) 70%; (11C) 90%; (11D) 100% (i.e., pure EHUT).

FIGS. 9A-9F show AFM images of thin films of the PS-DiBUT/EHUT system and the PS/EHUT control system, with 1:9 ratio between PS-DiBUT (or PS) and EHUT, annealed in chloroform vapor for different intervals. The films featuring the dynamic block copolymer compositions (FIGS. 9D-9F) exhibits a finer structure with much more uniform feature sizes than the control system (FIGS. 9A-9C). Additionally, the progression in annealing time shows an increase in the width of the brighter features (attributed to the EHUT phase) in the control PS/EHUT films, while the corresponding features in the PS-DiBUT/EHUT system remain rather constant in dimensions. These observations indicate that the PS-DiBUT/EHUT system adopts a morphological behavior that is analogous to that of block copolymers, while the control system behaves like a polymer blend.

FIGS. 10A-10D show AFM height images of PS-DiBUT/EHUT films annealed in different solvents. We focused on chloroform and toluene, since the behavior of EHUT in these solvents has been extensively studied by Bouteiller et al. It has been shown that in toluene EHUT adopts a rigid, long tubular structure consisting of 3 EHUT molecules in the cross-section, while in chloroform a shorter filament structure with one EHUT molecule in the cross-section is obtained. Our results show that under toluene annealing, the widths of the brighter domains are slightly larger than in chloroform (36 and 32 nm, respectively). This is consistent with the expected larger degree of polymerization of the EHUT blocks in toluene. Even more telling, though, is the observation that in chloroform the EHUT domains are longer and are capable of forming 180° bends, while under toluene annealing the resulting domains are much shorter and persistent in their orientation. These results are consistent with the rigidity of the EHUT tubules formed in toluene, resulting in a rod-coil behavior of the PS-DiBUT/EHUT copolymer. Such structures give rise to wider EHUT domains that cannot easily bend without losing packing interactions compared to the flexible filamentous EHUT blocks that are obtained when the films are annealed in chloroform.

The EHUT:PS ratio also has a strong effect on the film morphology. FIGS. 11A-11D show AFM images of films featuring increasing EHUT contents annealed under chloroform vapor for 120 min Low amounts of EHUT are insufficient to expose a pattern on the film surface. On the other hand, pure EHUT does not present the fine, block copolymer-type structure that films consisting of both the PS-DiBUT and EHUT present.

The invention claimed is:

1. A block copolymer comprising:
   at least one covalent polymer block and
   at least one supramolecular polymer block;
   wherein said copolymer is in a form of a melt,
   wherein said at least one supramolecular block consists of a series of monomers linearly connected by non-covalent bonds and the monomers forming said at least one supramolecular block are selected from the group consisting of 2,4-bis(2-ethylhexylureido)toluene (EHUT), a homodimer of 2-ureido-4[1H]-pyrimidinone (bis-UPy), a heterodimer of 2-ureido-4[1]-pyrimidinone and 2,7-diamido-1,8-naphthyridine (UPy-NAPy), a complex of thymine and 2,6-diamidopyridine, a metal coordination complex of a mend ion with two 2,2':6',2"-terpyridine ligands (bis-terpyridine), and any combination thereof.

2. The block copolymer according to claim 1, wherein the volume fraction between said at least one covalent polymer block, and at least one supramolecular polymer block is between about 0.1 to about 0.9.

3. The block copolymer according to claim 1, wherein said at least one covalent polymer block is selected from the group consisting of polystyrene, poly(2-vinyl pyridine), poly(4-vinyl pyridine), poly(methyl methacrylate), poly(n-butyl acrylate)poly(ethylene oxide), poly(propylene oxide), poly(1,4-butadiene), poly(1,2-butadiene), polyisoprene and any combination thereof.

4. The block copolymer according to claim 1, wherein the monomers of said supramolecular polymer block are connected via non-covalent bonds selected from the group consisting of hydrogen bonds, electrostatic bonds, ionic bonds, metal-ligand coordination bonds, $\pi$-$\pi$ stacking, and any combination thereof.

5. A method of forming a nanostructure having a pattern, said method comprising:
   (a) providing a patterned substrate;
   (b) depositing on said substrate a layer of a block copolymer according to claim 1 to form a layered substrate; and
   (c) subjecting the layered substrate to conditions that cause said block copolymer to order in accordance with the underlying pattern, thereby forming a nanostructure having a pattern.

6. The method according to claim 5, wherein said nanostructure is a film.

7. The method according to claim 5, wherein said conditions cause said block copolymer to order in accordance with the underlying pattern of said substrate includes thermal and/or solvent annealing.

8. The method according to claim 5, wherein sold substrate is patterned with at least one periodic region and/or at least one aperiodic region.

9. The method according to claim 5, wherein said substrate is patterned with at least one irregular feature selected from the group consisting of an angle, a T-junction, a ring, a corner, a bifurcation, a jog, and airs combination thereof.

10. A method according to claim 5, wherein the fidelity of replication is up to 25% of error.

11. A method of preparing a block copolymer according to claim 1, said method comprising the steps of:
   (a) providing at least one covalent polymer capped with at least one monomer having at least one functional group capable of forming a non-covalent bond:
   (b) providing at least one supramolecular polymer formed by monomers having at least two independent functional groups capable of forming non-covalent bonds, and (c) mixing said capped covalent polymer with a supramolecular polymer;
thereby forming said block copolymer.

12. A method according to claim 11, wherein said stop (a) is repeated.

13. A method according to claim 11, wherein step (a) is repeated with a different covalent polymer.

14. A method according to claim 11, wherein said steps (a) and (b) are repeated.

15. A method according to claim 11, wherein said steps (a) and (b) are repeated with a different covalent polymer and/or supramolecular polymer.

16. A nanostructure comprising a block copolymer according to claim 1.

17. A nanostrUcture according to claim 16, selected from the group consisting of a film, a nanotube, a nanoparticle, a nanocage, a nanocomposite, a nanofabric, a nanofiber, a nanoflake, a nanofoam, a nanomesh, a nanopillar, a nanoplatelet, a nanorod, a nanoshell and a nanotip.

18. A nanostructure according to claim 16, being a film.

19. A device comprising a nanostructure according to claim 16.

20. The block copolymer of claim 1, wherein said copolymer is characterized by comprising at least two and not more than four polymer blocks.

* * * * *

UNITED STATES PATENT AND TRADEMARK OFFICE
CERTIFICATE OF CORRECTION

PATENT NO. : 9,181,403 B2  
APPLICATION NO. : 13/600138  
DATED : November 10, 2015  
INVENTOR(S) : Roy Shenhar et al.

Page 1 of 1

It is certified that error appears in the above-identified patent and that said Letters Patent is hereby corrected as shown below:

In the Claims

Claim 1, column 18, line 16, delete "mend" and insert --metal--.

Claim 8, column 18, line 51, delete "sold" and insert --said--.

Claim 9, column 18, line 57, delete "airs" and insert --any--.

Claim 12, column 19, line 4, delete "stop" and insert --step--.

Claim 17, column 19, line 15, delete "nanostrUcture" and insert --nanostructure--.

Signed and Sealed this  
Seventh Day of June, 2016

Michelle K. Lee  
*Director of the United States Patent and Trademark Office*